US008635701B2

(12) United States Patent
Hilaiel et al.

(10) Patent No.: US 8,635,701 B2
(45) Date of Patent: Jan. 21, 2014

(54) SECURE BROWSER-BASED APPLICATIONS

(75) Inventors: Lloyd T. Hilaiel, Denver, CO (US);
David B. Grigsby, Encinitas, CA (US);
Gordon Durand, Truckee, CA (US);
Steven E. Spencer, Northridge, CA (US)

(73) Assignee: Yahoo! Inc., Sunnyvale, CA (US)

( * ) Notice: Subject to any disclaimer, the term of this patent is extended or adjusted under 35 U.S.C. 154(b) by 457 days.

(21) Appl. No.: 12/350,177

(22) Filed: Jan. 7, 2009

(65) Prior Publication Data

US 2009/0222925 A1 Sep. 3, 2009

Related U.S. Application Data

(60) Provisional application No. 61/067,872, filed on Mar. 2, 2008.

(51) Int. Cl.
*H04L 29/06* (2006.01)

(52) U.S. Cl.
USPC .............................. 726/25; 726/22; 713/193

(58) Field of Classification Search
USPC ............... 713/189, 191, 193, 194; 726/22, 25
See application file for complete search history.

(56) References Cited

U.S. PATENT DOCUMENTS

| 6,968,539 | B1 | 11/2005 | Huang et al. | |
|---|---|---|---|---|
| 7,287,277 | B2 * | 10/2007 | Circenis | 726/21 |
| 7,428,570 | B2 * | 9/2008 | Nobili et al. | 709/203 |
| 7,434,259 | B2 * | 10/2008 | Hofmeister et al. | 726/22 |
| 7,447,685 | B2 * | 11/2008 | Nye | 1/1 |
| 7,478,408 | B2 * | 1/2009 | Sesma | 719/328 |
| 7,490,332 | B2 * | 2/2009 | Sesma | 719/315 |
| 7,774,845 | B2 * | 8/2010 | Shipman | 726/23 |

(Continued)

FOREIGN PATENT DOCUMENTS

| JP | 2003-337630 A | 11/2003 |
|---|---|---|
| JP | 2003-337716 A | 11/2003 |

(Continued)

OTHER PUBLICATIONS

Herzog, Almut; Shahmehri, Nahid; "An Evaluation of Java Application Containers according to Security Requirements", 14th IEEE International Workshops on Enabling Technologies: Infrastructure for Collaborative Enterprise, Jun. 13-15, 2005, pp. 178-183.*

(Continued)

*Primary Examiner* — Victor Lesniewski
(74) *Attorney, Agent, or Firm* — James J. DeCarlo; Greenberg Traurig, LLP

(57) ABSTRACT

Techniques are provided for execution of restricted operations by computer program code in web browsers, where the code is permitted to invoke restricted operations if implicit or explicit consent is received. Such techniques may include generating a risk rating for a computer program code component, where the component includes at least one component operation for executing at least one restricted system operation; and prompting a user for permission to execute the restricted system operation, wherein the prompt includes the risk rating and a description of the component operation. The program code may include script code associated with a web page that invokes a web browser plugin, which in turn invokes the restricted system operation. The code may invoke the restricted system operation in response to receiving an input from a user via the web browser, where the input is for causing an action associated with performing the operation, the action implicitly granting consent to perform the operation.

21 Claims, 9 Drawing Sheets

(56) References Cited

U.S. PATENT DOCUMENTS

| | | | | |
|---|---|---|---|---|
| 7,792,964 | B2* | 9/2010 | Franco et al. | 709/225 |
| 7,797,421 | B1* | 9/2010 | Scofield et al. | 709/224 |
| 8,042,178 | B1* | 10/2011 | Fisher et al. | 726/22 |
| 8,078,740 | B2* | 12/2011 | Franco et al. | 709/229 |
| 8,181,264 | B2* | 5/2012 | Linn et al. | 726/30 |
| 8,336,095 | B2* | 12/2012 | Lam et al. | 726/17 |
| 8,370,518 | B2* | 2/2013 | Chen et al. | 709/232 |
| 2003/0009533 | A1* | 1/2003 | Shuster | 709/217 |
| 2003/0028655 | A1* | 2/2003 | Owhadi | 709/229 |
| 2003/0145316 | A1* | 7/2003 | McKinlay et al. | 717/173 |
| 2003/0233483 | A1* | 12/2003 | Melchione et al. | 709/310 |
| 2004/0083474 | A1 | 4/2004 | McKinlay | |
| 2004/0103309 | A1* | 5/2004 | Tracy et al. | 713/201 |
| 2004/0187023 | A1 | 9/2004 | Alagna et al. | |
| 2005/0071643 | A1* | 3/2005 | Moghe | 713/182 |
| 2005/0138416 | A1 | 6/2005 | Qian et al. | |
| 2005/0198287 | A1* | 9/2005 | Sauve et al. | 709/225 |
| 2005/0246761 | A1 | 11/2005 | Ross et al. | |
| 2005/0268112 | A1* | 12/2005 | Wang et al. | 713/188 |
| 2006/0156400 | A1* | 7/2006 | Shevchenko | 726/22 |
| 2006/0218642 | A1 | 9/2006 | Kuppusamy et al. | |
| 2007/0016954 | A1* | 1/2007 | Choi et al. | 726/25 |
| 2007/0101433 | A1* | 5/2007 | Louch et al. | 726/25 |
| 2007/0174424 | A1* | 7/2007 | Chen et al. | 709/217 |
| 2008/0047023 | A1* | 2/2008 | Lam et al. | 726/30 |
| 2010/0005527 | A1* | 1/2010 | Jeon | 726/22 |

FOREIGN PATENT DOCUMENTS

| | | |
|---|---|---|
| JP | 2004-070716 A | 3/2004 |
| KR | 10-2006-0082353 | 7/2006 |
| WO | WO 9935583 A2 * | 7/1999 |

OTHER PUBLICATIONS

Hsieh, Cheng-Hsueh A.; Gyllenhaal, John C.; Hwu, Wen-mei W.; "Java Bytecode to Native Code Translation: The Caffeine Prototype and Preliminary Results", Proceedings of the 29th Annual IEEE/ACM International Symposium on Microarchitecture, Dec. 2-4, 1996, pp. 90-97.*

International Search Report ( PCT/US2009/034833) dated Aug. 21, 2009; 3 pages.

Gong I. et al: "Going beyond the sandbox: an overview of the new security architecture in the Java<TM. Development Kit 1.2", Proceedings of the USENIX Smposium on the Internet Technologies and Systems: Dec. 8-11, 1997, Monterey, California: (Materials Science Forum; 308/311), USENIX Association, Berkeley, CA; (Dec. 8, 1997) pp. 103-112.

Supplementary European Search Report (EP 09 71 7012) dated Jan. 18, 2012; 2 pages.

Shimoda, "Tutorial for Development of Firefox Extended Functionality—Complete Explanation of Basics of XUL from Utilization of XPCOM!", Software Design No. 198, Japan, Gijutsu-Hyohron Co., Ltd., Apr. 18, 2007, pp. 116-123.

Foote, "10th Issue—Multimedia Content Formats in Depth; How Do They Make Interactive Broadcast/Communication Services Possible?" (10), The Journal of the Institute of Image Information and Television Engineers, Oct. 1, 2007, pp. 1435-1439.

Maruyama, "Special Edition—Internet, On Security of Signed Java and ActiveX Codes", COmputer Software vol. 16 No. 4, Japan, Japan Society for Software Science and Technology (ISSST), Jul. 15, 1999, vol. 16 No. 4, pp. 23-32.

* cited by examiner

Name    ImageAlter

Type    standalone

Version 1.1.1 - Also (1.0.0, 1.0.1, 1.1.4)

Corelet API  3

Description  A corelet based on ImageMagick to alter images locally and serve them over HTTP.

Functions:

Alter()  Alter(<path>file, <integer>maxwidth, <integer>maxheight,<integer>rotation, <string>quality, <list>effects, <string>format)

Alter an image and return a localhost URL by which the result may be accessed

Parameters file      =  The file that you would like to manipulate.
maxwidth  =  The maximum width of the image.
maxheight =  The maximum height of the image.
rotation  =  The amount of rotation, in degrees to apply to the image.
quality   =  "high", "medium", or "low". High quality takes longer but yields a better looking image. Default is Low.
effects   =  A list of effects to apply to the image. Effects will be applied in the order specified. Available effects are "sepia", "swirl", "solarize", "oil_paint", and "grayscale".
format    =  output format: "gif", "jpeg", or "png". Default is "jpeg".

FIG. 2

SECURE BROWSER-BASED APPLICATIONS

CROSS-REFERENCE TO RELATED APPLICATIONS

This application claims the benefit of application No. 61/067,872, "Browser-Based Applications and Interfaces Having Secure Access to Native Operating System Features," filed Mar. 21, 2008, which is incorporated herein in its entirety by reference.

BACKGROUND

1. Field

The present application relates generally to executing user-provided computer program code in restricted execution environments, and more particularly to enabling dissemination and execution of user-provided computer program components in security-restricted execution environments such as Web browsers.

2. Related Art

Techniques for executing computer program code in Web browsers are well known. Web pages may include code in a language such as JavaScript™, to be executed when the page is presented to a user in a browser such as the Microsoft® Internet Explorer™ browser, the Mozilla® Firefox® browser, and the like. Code implemented in programming languages such as the Java® language, the Microsoft® Jscript® language, and the Microsoft® C#® language may be downloaded from Internet servers, e.g., web sites, and executed by Web browsers. Some types of code or data, e.g., Adobe® Flash® scripts or Portable Document Format (PDF) documents, may be unsupported, i.e., not executable, by the browser itself, but the browser may be extended with plugins that support such specialized file types. A plugin is, for example, a computer program code module that is invoked by the browser (or other application) and may use the browser's features to display information, receive input, transfer data over a network, and the like. A plugin provides specialized features and is ordinarily activated, e.g., loaded from disk and initialized by the browser, in response to receipt of web content of a type associated with the plugin. Plugins are implemented in a programming language, e.g., C or C++, for which the browser provides a plugin Application Programming Interface (API). Unlike script code, e.g., JavaScript, which is executed by the browser in a secure environment that prevents code downloaded from the Internet from performing sensitive system operations such as accessing files and opening network connections to remote computers, the code that implements a plugin is ordinarily native code executable by the computer's processor. Such native code is not subject to the same level of security restrictions as browser-executed script code, and may perform sensitive system operations, potentially resulting in unauthorized data access or breaches of system security. Therefore, use of a plugin from an unknown or untrusted source is discouraged, and users are unlikely to use plugins provided by relatively unknown vendors. Furthermore, creating a browser plugin is a relatively difficult and expensive undertaking for several reasons. For example, security issues must be identified and resolved. Further, a relatively difficult to use, platform specific programming language is used by many browsers for plugin development, platform specific versions of the plugin are created and distributed for each type of platform (e.g., the Microsoft Windows® operating system, the Apple® Mac OS operating system, the Linux® operating system, and the like) to be supported by the platform, browser-specific version of the plugin may need to be created and distributed for each type of browser supported by each platform, e.g., Internet Explorer on Windows, FireFox on Windows, FireFox on Mac OS, and the Safari® browser on Mac OS.

As introduced above, because of the potential harm that may be caused by program code that has unrestricted access to a computer's resources, security restrictions are imposed on code executed by the Web browser, particularly if the code is from an unknown or un-trusted server. For example, most Web browsers place restrictions on the ability of downloaded code to access files, networks, operating system interfaces, storage devices, and other resources. Code executed on a client computer by a browser, such as downloaded code, is subject to tighter security, because such code could delete files, improperly use system resources, retrieve information stored on the computer, search the computer for security vulnerabilities, present requests to the user for sensitive information (phishing), install a virus on the computer, use the computer to attack or spread the virus to other computers, and so on. Therefore, Web browsers such as Internet Explorer do not allow code from un-trusted servers to execute unless permission is granted by the user.

Many existing browser-based runtime environments for executing downloaded code, such as Java applets, ActiveX™ controls, and Firefox extensions, ask the user for blanket permission to run and access any system resource. ActiveX controls are computer program code modules that can be embedded in a web page and executed by Internet Explorer when the web page is accessed, i.e., downloaded from a web server 100. When code such as an ActiveX control is downloaded as part of a web page and attempts to execute in the Internet Explorer browser, the browser displays a warning message to the user, and prevents execution of the entire control unless the user explicitly allows or approves execution of that control, or, in other examples, unless the user explicitly allows execution of code from that server or that server's network domain. Once the user approves execution of the control, the control may access a wide range of system resources.

Other existing runtime environments, such as the Microsoft Windows Vista® operating system, offer a level of security granularity that has little meaning to an end user, e.g., by asking the user for permission to read files. Some programming languages, such as Java, permit downloaded code scripts to access restricted resources on the computer using security credential information, e.g., digitally-signed certificates. However, the security credentials of downloaded code are exposed to the user, and the user is often responsible for maintaining the credentials, e.g., updating them when they expire and keeping them confidential. Furthermore, certain system resources such as special-purpose devices may not be available to programs written in the web programming language being used (such as JavaScript or Java) even if permission is available, because the language lacks an interface to those resources. Such resources can be accessed via a "native" programming language such as C++, but communication between a native language and a web programming language is complex, and existing web programming frameworks do not provide features for integrating native programs with browser-based web applications.

These security restrictions diminish the ability of applications developed in existing web programming frameworks to provide a rich user interface that matches user interfaces provided by native applications in terms of system resource access and other features. Existing frameworks provide rudimentary security features that are complex and place the burden of ensuring security on the application developer. It would be desirable, therefore, to have a programming framework that allows programmers to quickly and easily develop web applications that safely and securely access security-sensitive system resources.

SUMMARY

In general, in a first aspect, the invention features a computer-implemented method that includes generating a risk rating for a computer program code component, where the component includes at least one component operation operable to cause execution of at least one restricted system operation, wherein the risk rating is based upon a digital certificate with which the component or a description associated with the component is signed; generating a description of the component operation; and prompting a user for permission to execute the at least one restricted system operation, wherein the prompt includes the risk rating and a description of the component operation.

Embodiments of the invention may include one or more of the following features. Generating the risk rating may be in response to receiving a web page that includes computer program script code for causing execution of the computer program code component. The risk rating may be one of at least two risk levels, including a highest risk level and a lowest risk level. Prompting the user for permission may occur in response to a first reference of the component by computer program script code executed in response to a web browser receiving a web page associated with the script code. The computer program code component may be for execution in response to an invocation of a plugin executing in a web browser by computer program script code executed in response to the web browser receiving a web page associated with the script code. Prompting the user for permission may include displaying a named permission that corresponds to the at least one restricted system operation, and the named permission may be granted by the end user as a precondition to executing the restricted system operation.

In general, in a second aspect, the invention features a computer-implemented method of enabling web browser-based code to execute a restricted system operation on a client computer. The method includes providing, at a server computer, computer program code to the client computer, the code including at least one component having at least one component operation for invoking the restricted system operation; the computer program code may further include an implementation of the component, where the implementation is for causing display of a prompt for requesting permission from the user to perform the restricted system operation, and further for to invoking the restricted system operation in response to receiving permission from the user, and the prompt is based upon a risk rating associated with the component and upon the component operation. The prompt may include the risk rating associated with the component. The program code may be a web browser plugin. The component may be associated with a risk tier selected from a plurality of risk tiers, and the risk rating may be a brief phrase based upon the risk tier. The risk indicator may include a phrase based upon at least one operation provided by the component. The component may include an implementation function and an interface definition describing the implementation function. The prompt may display a request for permission on an output device of the computer. Receiving permission from the user may include receiving an affirmative response from the user via an input device of the client computer. The method may further include receiving a certificate of a signing authority associated with the component, and the risk rating may be further based upon the certificate. The restricted system operation may include accessing a file, accessing a network, accessing a display device, or a combination of those.

In general, in a third aspect, the invention features a computer-implemented method of enabling web browser-based code to execute a restricted system operation on a client computer. The method includes providing, at a server computer, computer program code to the client computer, the program code including at least one component having at least one component operation for invoking the restricted system operation, the code for execution by the web browser in response to an invocation of the component by script code associated with a web document, where the code is operable to invoke the restricted system operation in response to receiving an input from a user via the web browser, and the input is for causing an action associated with performing the operation, the action implicitly granting consent to perform the operation. The action may include at least one step in performing the operation.

In general, in a fourth aspect, the invention features a computer-implemented method that includes receiving an invocation of a component operation from computer program script code executed in response to receipt of a web page by a web browser, wherein the component includes at least one component operation operable to cause execution of a restricted system operation; and allowing the component operation to cause execution of the restricted system operation in response to receiving an input from a user via a web browser, where the input is for causing an action associated with performing the operation, the action is not an explicit grant of permission to perform the operation, and the action implicitly grants permission to perform the operation.

In general, in a fifth aspect, the invention features a computer-implemented method of enabling web browser-based code to execute a restricted system operation on a client computer. The method includes causing display of a prompt for requesting permission from a user to perform a restricted system operation in response to invocation of a component operation; and invoking the restricted system operation in response to receiving permission from the user, where the prompt refers to an object or service on which the component operation operates.

In general, in a sixth aspect, the invention features a computer readable medium that includes computer-executable instructions for enabling computer program code to be executed in a web browser to perform a security-restricted operation, the instructions for providing to the web browser via a computer network a component that includes an interface and a native language implementation that implements at least a portion of the interface, where the implementation is for invoking the native language implementation in response to invocation of the interface by the plugin code in the web browser, and the native language implementation is for prompting a user for permission to perform the operation, and further for invoking the operation in response to receiving permission from the user, wherein the prompt is based upon a risk indicator associated with the component, the prompt is further based upon at least one permission requirement associated with the component, and the prompt includes a description of an operation associated with the permission requirement, wherein the description refers to at least one application-specific feature of the component.

Embodiments of the invention may include one or more of the following features. The computer readable medium may further include computer-executable instructions for receiving a certificate of a signing authority associated with the component, wherein the risk indicator is based upon the certificate and the operation. The security restricted native operating system operation may be accessing a file, accessing a network, accessing a display device, or a combination of those.

In general, in a seventh aspect, the invention features a computer readable medium comprising computer-executable instructions for enabling browser-based program code associated with a web page to selectively access native operating system resources of a browser host computer. The method includes receiving a component that in turn includes an implementation function and an interface that enables the browser-based program code to invoke the implementation function, wherein the implementation function is operable to perform a restricted system operation on the browser host computer in response to receiving permission from a user of the browser host computer to access the restricted system operation; in response to invocation of the interface by the browser-based program code, prompting the user for permission to perform the restricted system operation; and invoking the implementation function to perform the restricted system operation in response to receiving an affirmative response from the user.

In general, in an eighth aspect, the invention features a computer-readable medium comprising computer executable code for displaying a prompt for permission to execute a component of the computer executable code, wherein the prompt is based upon a risk indicator associated with the component, the prompt is further based upon at least one permission requirement associated with the component, and the prompt includes a description of an operation associated with a permission requirement, where the description refers to at least one application-specific feature; and in response to receiving an affirmative response to the prompt from the user, granting permission to the component to execute an operation specified by the permission requirement.

In general, in a ninth aspect, the invention features a system that includes a processor; a memory coupled to the processor; and program instructions provided to the memory and executable by the processor to provide, at a server computer, computer program code to the client computer, the program code including at least one component having at least one component operation for invoking the restricted system operation, and the code for execution by the web browser in response to an invocation of the component by script code associated with a web document, where the code is for invoking the restricted system operation in response to receiving an input from a user via the web browser, and the input is for causing an action associated with performing the operation, the action implicitly granting consent to perform the operation.

BRIEF DESCRIPTION OF THE DRAWINGS

The present application can be best understood by reference to the following description taken in conjunction with the accompanying drawing figures, in which like parts may be referred to by like numerals:

FIG. 2 is an illustrative drawing of information about a component in accordance with embodiments of the invention.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1A:
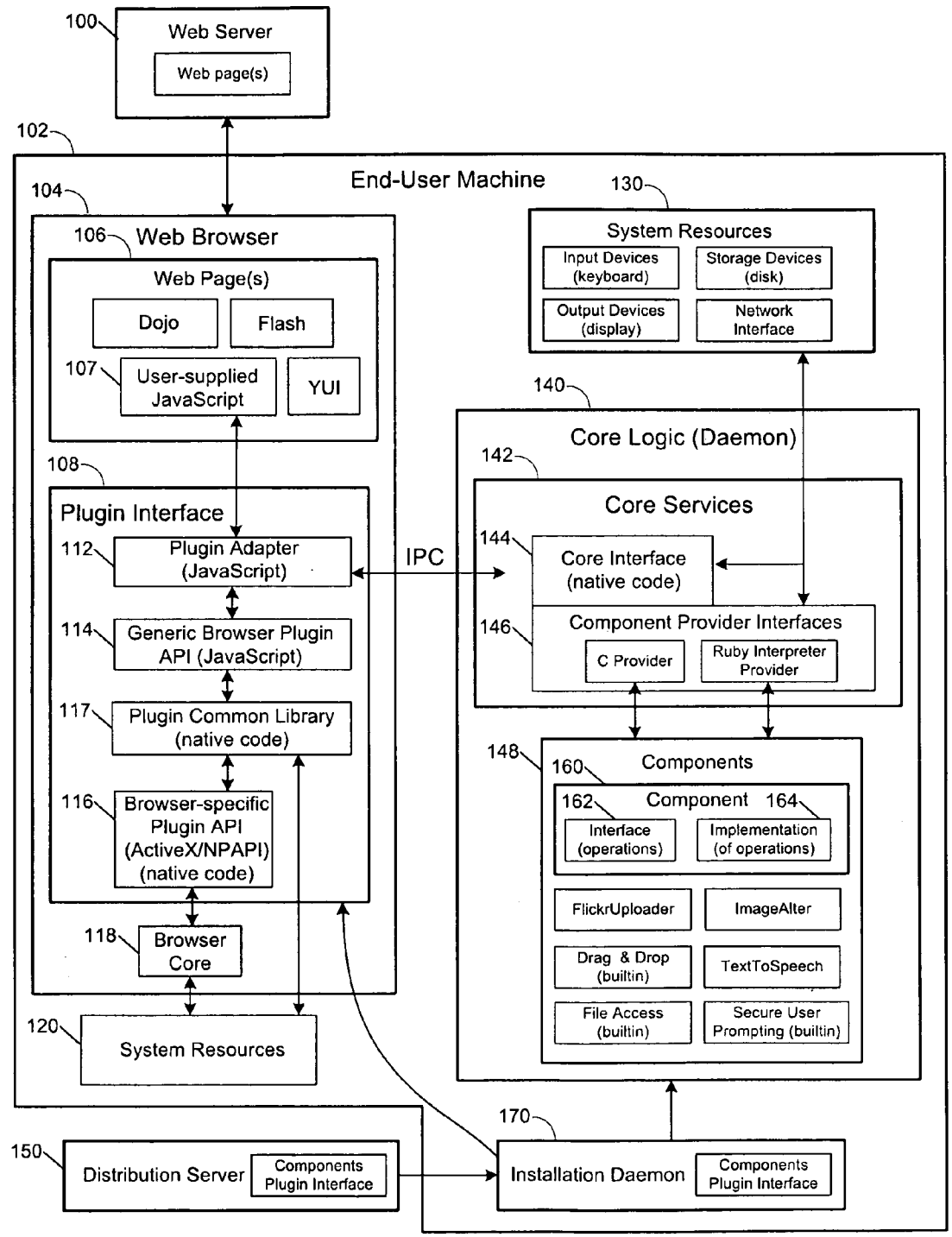
FIGS. 1A-1E are illustrative drawings of a system for executing components in a web browser in accordance with embodiments of the invention.
Figure 1B:
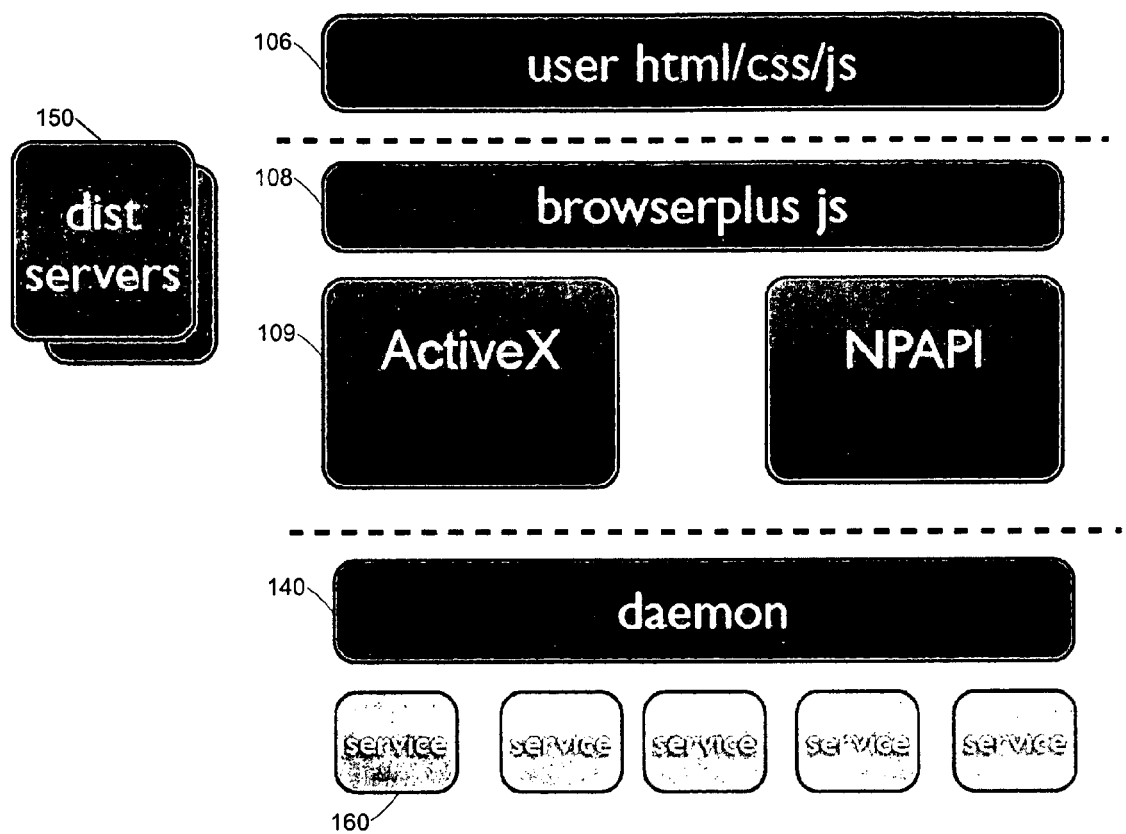
Figure 1C:
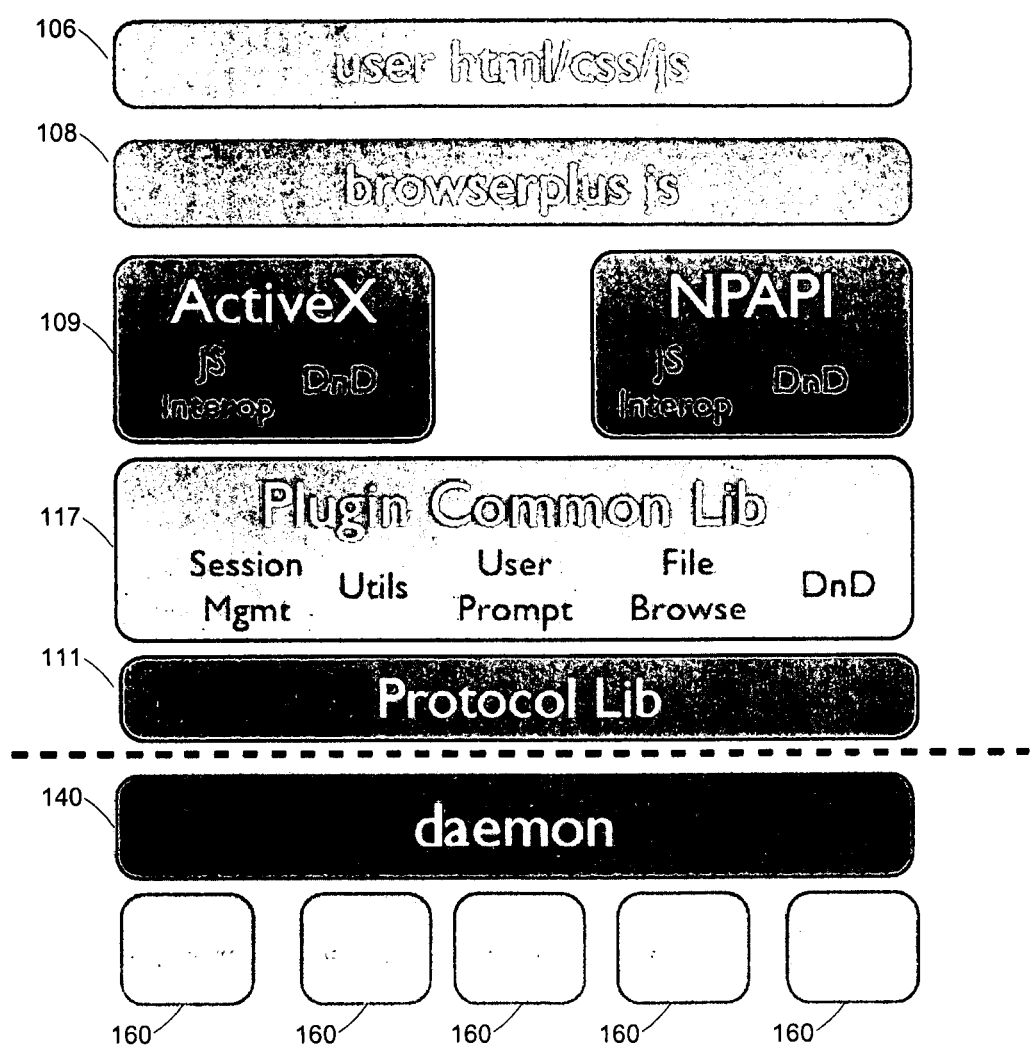
Figure 1D:
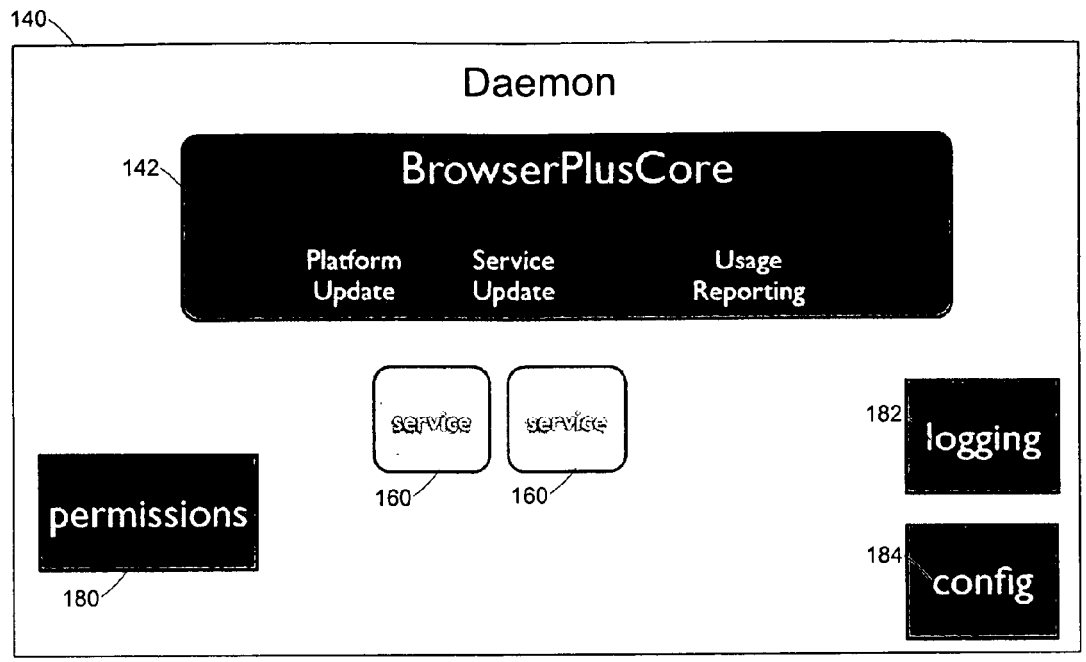
Figure 1E:
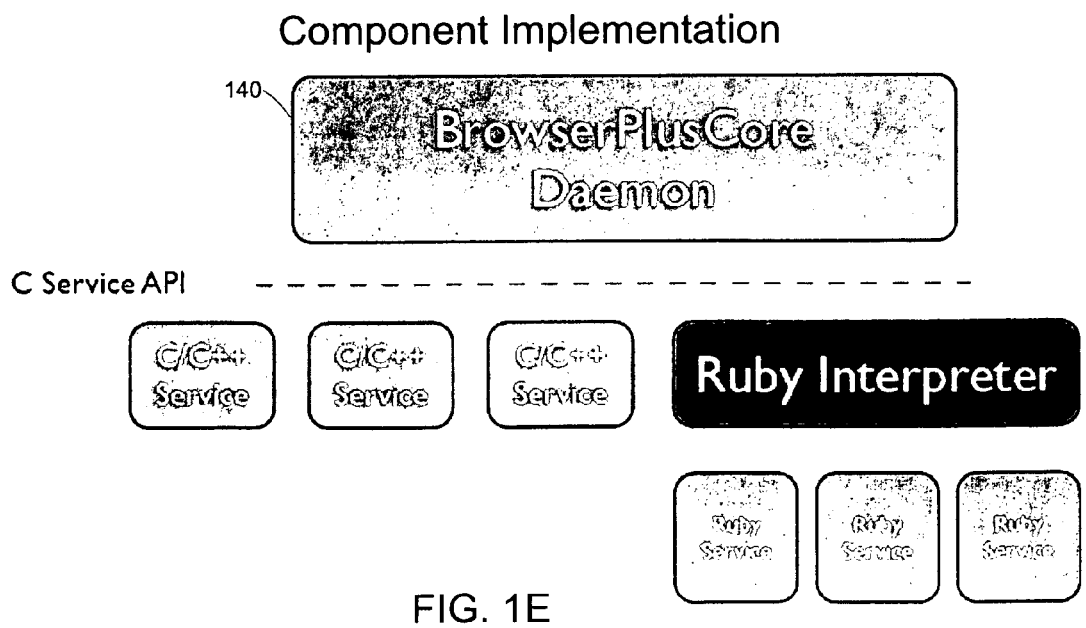

FIGS. 1A-1E are illustrative drawings of a platform for executing components 148 in a web browser 104 in accordance with embodiments of the invention. FIG. 1A shows an overall view of the platform's functional units, and FIGS. 1B-1E show more detailed views of specific functional units. The components 148 may be, for example, computer program code modules that provide services not ordinarily available to web-based code, such as JavaScript™, in the web browser 104. These services include, for example, drag-and-drop operations, text-to-speech operations, and other restricted or native system operations and resources 130. Software developers may add additional components 148 by defining an interface 162, which specifies one or more operations provided by the component, and an implementation 164 of the operations. Examples of components include a FlickrUploader component that provides drag-and-drop user interface for uploading images to the Flickr® online photo-sharing service by dragging and dropping files from the user's computer into a user interface region provided in the web browser 104 by the FlickrUploader component. Other example components include a text to speech component and an image processing component (named ImageAlter). The components 148 are made available to user-supplied browser-based program code 107, e.g., JavaScript code downloaded from a web server as part of a web page. The example platform of FIG.

1A, including the plugin interface 108 and the daemon 140, enables such browser-based program code to use the components 148. Since the components 148 provide features not otherwise available in web browsers 104, the components 148 expand the set of features of the end-user machine 102 that are available to the web pages 106. As the features provided by the components often use restricted system operations and resources, which are subject to potentially harmful misuse, effective security measures are needed to ensure that the components use the restricted operations and resources in ways that are approved explicitly or implicitly by the end user.

The system 102 includes component execution logic 140, which provides core services 142 and component provider interfaces 146, such as a C provider interface and Ruby™ interpreted programming language provider interface. Although C and Ruby are described herein, other languages may be supported by the component provider interfaces 146, such as C++, Java, and the like. The component execution logic 140 includes a set of components 148 that includes at least one component 160. Each component includes implementation function(s) 164 and interface definition(s) 162 that describe the implementation function(s) 164. The interface definitions may be, for example, a JSON manifest file that describes the names and parameters of operation(s) that are provided by the component 160 and implemented by the implementation 164. In one example, the implementation function(s) 164 perform restricted system operation(s) on the browser host computer 102 if permission for the operation(s) is received from a user of the browser host computer. That is, the implementation function prompts the user to approve particular restricted or security-sensitive operations that the function will perform if executed, such as opening a file or network connection, communicating via a network connection, or accessing a system resource such as a printer, voice synthesizer or storage device, or the like. Each implementation function may choose a suitable level of granularity for the security prompts. For example, an implementation function may prompt the user for each file access, for all file accesses, or for file accesses for the duration of a web browser session, and so on. At least a portion of the implementation function(s) may be implemented using native code, as known to those skilled in the art.

A restricted system operation may be, for example, a native function (i.e., a function callable from a language such as C or C++, and not ordinarily available directly to the components 148 because the components 148 may be implemented in a language that does not directly access the native functions, such as Ruby). The native function accesses the system resource, possibly by supplying the user's login credentials or a digital certificate associated with the user or end-user machine 102 to establish the user's identity and access permissions. The native function may, for example, display information on an output device and/or receive information from an input device, or perform operating-system-specific functions such as drag-and-drop, text to speech, file browsing, and so on. The native function may access data stored on a magnetic disk, an optical disk, a semiconductor-based memory, or the like.

Such restricted system operations may only be accessible by native code, e.g., code in a language such as C or C++ that is compiled into machine-level instructions. Programming languages commonly supported in web browsers, such as Java, JavaScript, and Ruby do not have features for accessing certain native operating system or hardware features, or, even if the languages do have the features, the features are often disabled by the web browser 104 because of the security risk posed by unrestricted access to such features. The plugin interface 108 allows browser-based code 107 (e.g., user-supplied JavaScript code downloaded from a web server 100) to access such restricted features by providing component execution logic 140 that allows developers to implement components 148 that access such features via native code portions of component implementations 164 provided by the developers, or via built-in native code, for certain commonly-used features. The plugin interface 108 is, in one example, a browser plugin that interacts with the web browser 104 via a browser plugin Application Programming Interface (API) such as ActiveX or NPAPI. The browser-based program code 107, as well as the components 148 (including both native and non-native code portions), are prevented from making unauthorized use of restricted system operations by inclusion of security checks in the component implementations 164, such as secure user prompting to verify that the end user approves invocation of a restricted operation, or by the component implementations 164 and/or plugin common library 117 requiring that a particular type of permission (e.g., permission to open an IRC connection) be available to the end user before invoking the restricted features.

The core interface 144 includes native implementations for accessing operating system or hardware features such as user interface drag and drop, file access, secure user prompting, text to speech, and GPS interfaces. Built-in, i.e., predefined, components are provided for accessing these predefined native implementations from common languages such as JavaScript and Ruby. The components 148 include predefined components such as components for drag and drop, file access, secure user prompting, text to speech, GPS, and the like.

In one example, the system modules, including the plugin interface 108, the core services 142, and the components 148, are installed (i.e., made available for execution) on the end-user machine 102 by an installation daemon 170, which receives the modules from a distribution server 150 via a computer network such as the Internet. The installation daemon 170 is installed by a user, and inherits the user's access credentials, which the daemon 170 uses to install the system modules on the user's machine 102. The system modules inherit the user's access credentials and use those credentials to execute native code and access restricted system operations.

The web browser 104 includes web pages 106 received from a web server 100. The web pages may include or reference user-supplied JavaScript code 107. The JavaScript code 107 is an example of browser-based code, which may be computer program code that is callable, i.e., may be invoked, by the web browser 104. The web browser 104 also includes a plugin interface 108, which uses a generic browser plugin API 114 to interact with a browser-specific plugin API 116 that in turn interacts with the browser core 118 to interface the generic browser plugin API 114 to the browser 104. A plugin adapter layer 112 provides the interface between the user-supplied script code 107 (e.g., JavaScript) and a generic browser plugin API (e.g., also JavaScript) that interacts with a native-code plugin common library 117 (e.g., C or C++), which is able to invoke restricted system operations that are not available in the scripting language code execution environment ordinarily provided to web pages 106 by the web browser 104. The plugin adapter 112 is invoked, for example, in response to a component invocation instruction from the browser-based program code 107. The plugin adapter 112 may conversely be invoked by the generic browser plugin API 114, e.g., in the form of callback invocations that provide results or notifications to the user JavaScript 107.

The core logic 140 includes one or more language-specific component provider interfaces 146 as introduced above. The component execution logic 140 may be implemented as a daemon, i.e., a process that runs in the background and/or independently of a particular user, and communicates with one or more plugin interfaces 108. The core logic daemon 140 loads the interface and implementation for each of the components 148, e.g., when the daemon is initialized, or when a request is received for a component 160. The component implementations are loaded using a dynamic loading or linking process, as appropriate for the language in which the component 164 (e.g., a dynamic library open call for a C-language component, or an appropriate Ruby load operation for a Ruby component). Each component provider interface 146 receives a component invocation request from the plugin adapter 112. The component invocation request is, in one example, a serialized version of the component invocation instruction, suitable for transmission via interprocess communication from the plugin adapter 112, which is part of the browser process, to a core interface 144 of core services 142, which are part of the core logic daemon process 140. The core interface 144 forwards the serialized invocation instruction to the component provider interface 146, which invokes the appropriate implementation function of the corresponding component 160, where the function and the component are specified in the component invocation request. In one example, the provider interface logic 146 may revoke permission from the user of the browser host computer in response to completion of the operation. In another example, the provider interface logic may revoke permission from the user of the browser host computer in response to termination of a network session associated with the browser-based program code.

The provider interface 146 may communicate the interface definition to the plugin adapter logic. In languages such as Ruby that provide for introspection of types, the interface definition may be automatically derived from the component implementation provided by the user. The plugin adapter 112 may receive the interface definition from the component.

The provider interface 146 may load the component(s) 148 from a distribution server 150, a storage device, or other data source. The component(s) 148 may be, for example, shared libraries, and may be packages that include an interface definition, an implementation of the interface, and documentation of the interface. The component(s) 148 may be provided by any trusted entity. The operation of each component 148 is substantially secure (i.e., does not access any system resources that may result in a security breach) if the implementation ensures that user permission is requested and received before performing any operation on a system resource. User-supplied JavaScript will be unable to perform a malicious act on the computer 102 as long as the user is prompted, because the user-supplied JavaScript cannot ordinarily provide an answer to the prompt.

The implementation function may provide a result, where the provider interface logic and the plugin adapter logic communicate, i.e., forward, the result to the browser-based program code. That is, a response may be returned from the component(s) 148 to the user-supplied JavaScript.

Depending on the certificate that has signed a particular component and all associated information about the component, it is possible to provide an end user with a meaningful understanding of the risk of allowing execution of a component. When components are required by a web-page, the system obtains component descriptions. These descriptions may be signed or unsigned. Unsigned components are "anonymous", and are executed as "sand-boxed" components. The risk of signed components is dynamically and securely determined based on the certificate with which they are signed. This tiered approach allows decentralized development of secure components. A prompt is presented to the user to request permission to execute operations provided by the component. The type and nature of the prompt presented to the user is based on the risk of the components and the particular component operations.

As introduced above, a "risk rating" may be generated for a component to allow a user to decide if the component may be executed on the user's computer. The risk rating is based on the certificate that signed the component and other information about the component. The certificate that signed the component identifies the provider of the component as either a trusted authoritative entity, in which case the component is considered an official component, or a third-party component, in which case the trusted authority guarantees that the identity of the component provider (e.g., publisher) is correct, or an independent component, in which case the component provider is known to the trusted authority, or an anonymous component, in which case the trusted authority warns against installation or execution of the component. The risk rating is conveyed to the user when the user is asked for permission to execute the component. In one example, the risk rating is displayed to the user in a request for permission to execute specific restricted system operations that the component will perform if one or more operations provided by the component are invoked. In one example, the request for permission is displayed in response to initialization of the component, where initialization may occur in response to the browser receiving a web page that includes script code, and the script code includes a statement that invokes an operation (e.g., a method, procedure, or function) of the component. In another example, the request for permission is displayed in response to invocation of a particular operation by the script code, prior to executing the component operation.

In one example, the risk ratings correspond to tiers in a plurality of risk tiers that range from low risk to high risk. A tiered risk rating system is provided to indicate the level of caution that the user should exercise in using particular components. In one example, each one of multiple tiers corresponds to a risk rating as described above, i.e., the risk is based on the certificate that signed the component. A prompt is presented to the user by a component that needs access to a particular resource to perform restricted operations such as reading files. The prompt changes in accordance with the risk of the components. The risk may be presented to the user as a brief phrase based upon the risk, e.g., "Very Low Risk" or as a more detailed phrase based on the risk and the operations that the component expects to invoke, e.g., "Very low risk of erasing or overwriting pictures stored on your computer."

In one example, four risk tiers are provided, and a component may be associated with one of the tiers. A risk rating may be associated with each of the tiers.

| Tier | Risk Level |
| --- | --- |
| Official Components | A trusted authoritative entity vouches for the integrity of the component. Very low risk. |
| 3rd Party Components | A trusted authoritative entity guarantees that the identity of the publisher is correct. Low risk. |
| Independent Components | The publisher of the component is known to a trusted authoritative entity. Medium risk. |
| Anonymous Components | A trusted authoritative entity warns against installation of the component. High risk. |

This system provides for secure external authoring of components. A trusted authority acts as a "gate-keeper" and issues signing certificates to these various entities. Depending on the certificate that has signed a particular component and associated information that describes the component, a meaningful description of the component's risk may be generated and presented to the user. That is, the risk level is based on the degree of trust in the certificate, with highly-trusted certificates having the lowest risk.

In one example, component descriptions are obtained when components are used, e.g., when components are invoked by script code on a web-page. These descriptions may be signed or unsigned. Unsigned components are "anonymous", and are executed in a protected "sandbox" environment. The risk level of signed components is dynamically and securely determined based on the certificates with which the components are signed. This tiered approach allows for decentralized component development. Furthermore, execution of high-risk classes of components can be disallowed by default, thereby minimizing the risk to average users, while enabling component developers to use most types of system resources.

In one example, component permission objects are provided to represent permission to execute a particular operation associated with the permission objects. A component permission includes a name and a description. For example, the permission ConnectToChatServer, which represents permission to connect to a chat server, may have an associated description "Make connections to IRC (chat) hosts." The component permissions represent operations that are meaningful to a user, e.g., application-specific operations such as connecting to a chat server. The description of a component permission likewise describes the permission in terms meaningful to the user, e.g., "Make connections to IRC (chat) hosts" is more meaningful than "open network connections" or "open network connections on ports in the range 6667-7002." The portion of the description "IRC (chat) hosts" refers to an application-specific feature, e.g., IRC or chat hosts. A description that lists ports 6667-7002, without stating the application, does not refer to a specific application, and therefore does not refer to an application specific feature.

In one example, a requirement for a permission object may be associated with a security-sensitive component operation, and the component may request that the corresponding permission object, e.g., the ConnectToChatServer permission described above, be obtained during initialization or initial processing of the component. When a component is to be executed, and is requesting permission to invoke an operation. The permission object needed for an operation may be obtained by prompting the user using secure user prompting as described elsewhere herein. If the user responds with an affirmative "yes" to a prompt that describes the action to occur, then permission is granted to the user to invoke the operation. In another example, the user may have an associated digital certificate, which may substitute for the secure user prompting, thereby providing permission for the user to invoke the operation. The operation may be associated with a required maximum risk level, so that the operation can be executed by a user with a certificate having a risk level that is lower than or equal to the required maximum risk level of the operation.

For example, a Chat component may include an operation named "connect", which opens a network connection to a chat server. The chat component may be implemented partially in one language, e.g., Ruby, and partially in second, native, language, e.g., C. The native language implementation may include a direct invocation of an operating system network connection function, in which case the native language implementation checks for the presence of a permission associated with the user, where the permission corresponds to the operation to be performed, e.g., the network connection function, such as a ConnectToChatServer permission. If the permission is present (e.g., associated with the user), then the native implementation invokes the operating system network connection function. If the permission is not present, the implementation invokes a secure user prompting user interface, which presents a prompt to the user, e.g., "Do you give permission to communicate with the chat server over the network? The risk level of this action is low." The prompt includes a phrase that describes the action to be performed, and the action is described in terms of the component operation, which is in the above example the "connect" operation for establishing a network connection to a chat server. The prompt describes the permission being requested in terms of the component operation, e.g., communication with a chat server. The prompt also describes the risk level, e.g., low. The prompt describes the operation in terms of the semantic meaning of the component operation, as opposed to the meaning of the underlying operating system function, e.g., connect to port 7000 of server "a.b.com," which is less meaningful to a user of the component.

FIG. 2 is an illustrative drawing of metadata information for a component in accordance with embodiments of the invention. FIG. 2 shows properties of an example component 200, including the component's name 202 (ImageAlter), type 204 (standalone), version 206 (1.0.1), corelet (i.e., component) API version 208 (3), description 210 ("A corelet based on ImageMagick to alter images locally and serve them over HTTP"), and interface specification 212, which includes an operation specification 214 and documentation 216. The interface specification 212 is used by the component execution logic 140 of FIG. 1A to register an interface (as specified by the interface specification 212) and an implementation as a component 148. The component execution logic 140 may, in one example, determine the interface of the component by extracting each operation's name and parameter types from the interface specification 212. The implementation may include, for example, program code implemented in a language such as Ruby in source, object, or byte code form, including a native implementation (in a language such as C++) for any portions that access native operating system functions. Once registered, the operations provided by the component's interface are available for use by browser-based code 107. In this example, the interface 212 is specified in text format and includes a single operation named Alter. The example interface specification is:

Alter(<path>file, <integer>maxwidth, <integer>maxheight,
   <integer>rotation, <string>quality, <list>effects, <string>
   format.

Additional operations may be included in the interface by adding additional entries to the metadata in the form of the interface specification 212. The documentation 214 provides a description of the exemplary Alter operation, i.e., "Alter an image and return a local host URL by which the result may be accessed." The documentation 214 may be automatically converted for use in a development tool, such as an integrated development environment.

Figure 3:
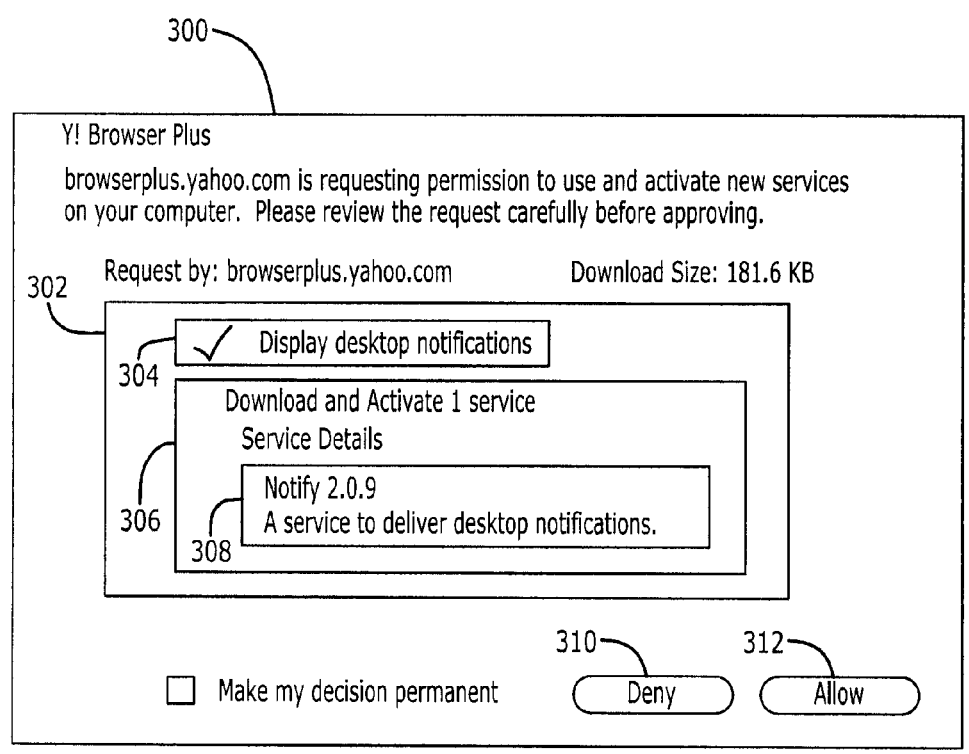
FIG. 3 is an illustrative drawing of a prompt for requesting permission to execute a component in accordance with embodiments of the invention.

FIG. 3 is an illustrative drawing of a prompt displayed in a web browser to request permission to execute a component in accordance with embodiments of the invention. FIG. 3 shows a prompt dialog box 300, which displays a prompt stating that a host computer (browserplus.yahoo.com in this example) is requesting permission to use and activate a new service (i.e., component) on the user's computer. The prompt asks the user to review the list of requested permissions 302 carefully before approving. The requested permissions 302 include a Display desktop notifications permission 304 and a Download and Activate service permission 306. The Display desktop notifications permission has already been allowed by the user, as shown by the checkmark displayed adjacent to the description of the permission 304. The Download and Activate permission 306 includes further details about the service to be downloaded and activated, including a Notify service description 308, which states that the Notify service is a service to deliver desktop notifications. A Deny button 310 may be selected by the user to deny permission to Download and Activate. An Allow button 312 may be selected to allow the Download and Activate service to execute. Similar prompts may be displayed for user-defined components when the components are invoked by browser-based code.

Figure 4:
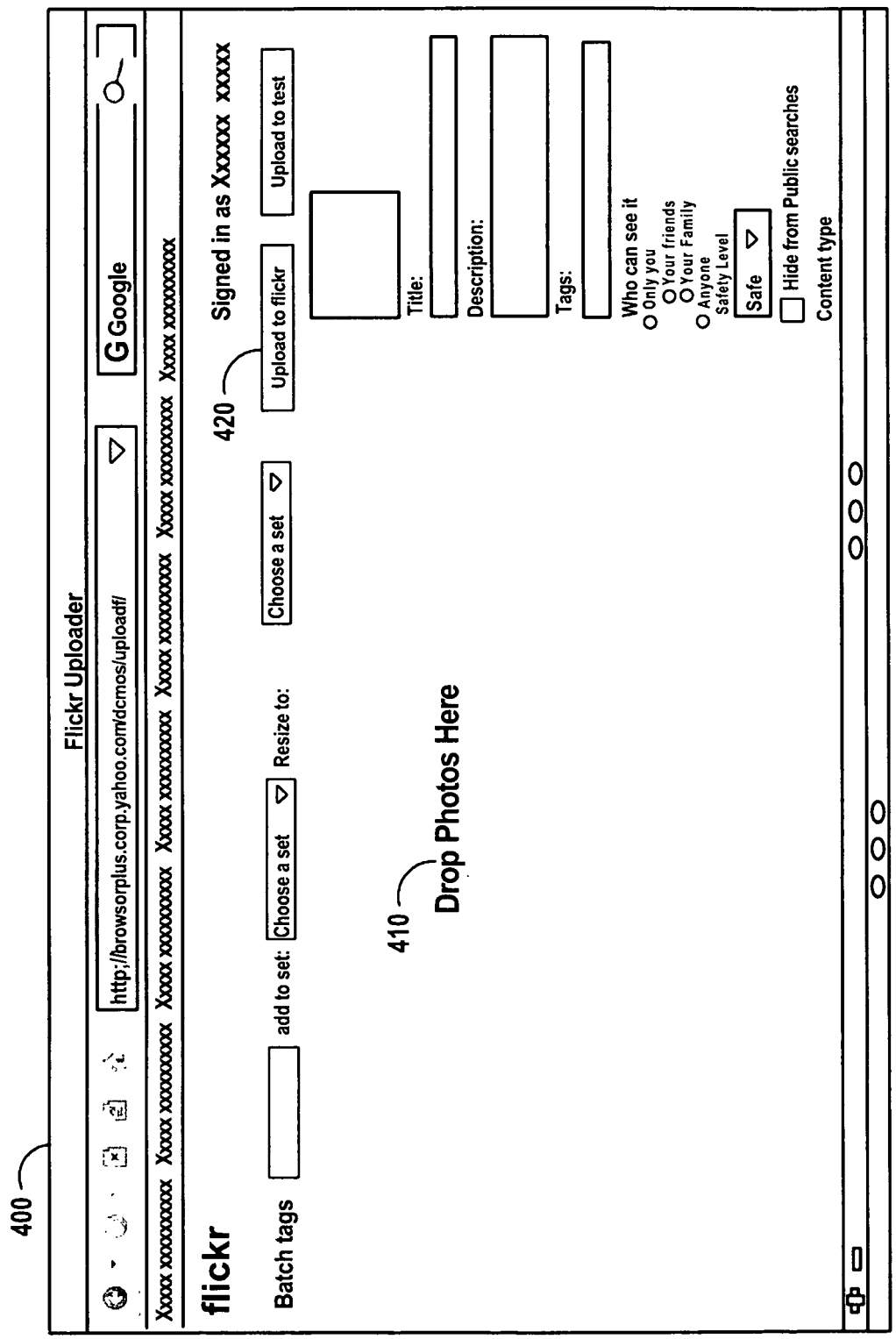
FIGS. 4 and 5 are illustrative drawings of a file upload component in accordance with embodiments of the invention.
Figure 5:
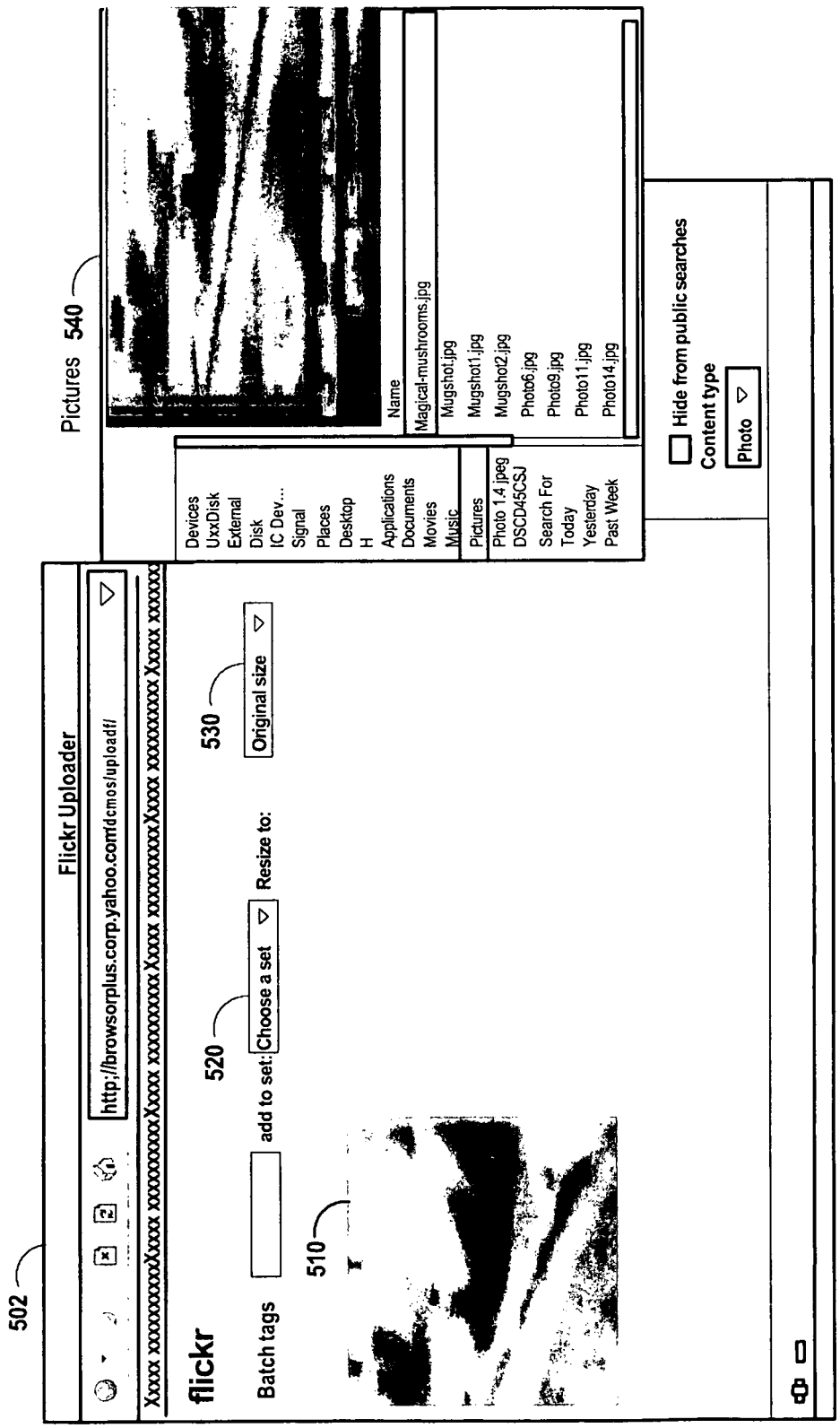

FIGS. 4 and 5 are illustrative drawings of a file upload component in accordance with embodiments of the invention. The file upload component 400 allows picture files to be dragged and dropped onto an area 410. The files are then uploaded to Flickr® by the component. FIG. 5 shows a picture 510 that has been uploaded from a Pictures directory. The interface also includes components 520 for applying transformations and 530 for resizing the picture. These components invoke local operations (e.g., the ImageMagick library) on the user's computer to process the picture from within the web browser.

In one example, if a component is missing, the component execution logic 140 queries any number of distribution servers to find and retrieve the component, including resolving dependencies. Components 148 are versioned, i.e., associated with version numbers, and a component version may be required by another component or, at the level of an end-user machine 102, by a plugin interface 108. In one example, a component 148 is associated with a version that includes a major version number, a minor version number, and a micro version number, to form a version, e.g., 2.0.1. A component has a unique name specified by, for example, the Internet domain name of the component provider combined with a name that describes the component itself. Thus an example component name is "com.vendor.ImageAlter". A version specifier may include major and minor or major, minor, and micro numbers. A component version matches a version specifier if all numbers present in the version specifier are identical to the corresponding numbers in the component version. In one example, three lists are considered when determining how to satisfy the request for a component: what updates are available on the end-user machine 102 (priority 1), the components that are installed (priority 2), and the components that are available from the network, e.g., the distribution server 150 (priority 3).

Security mechanisms are provided in accordance with embodiments of the invention. The security mechanisms include secure user prompting, implicit consent, and secure resource representation. Secure user prompting includes, in one aspect, displaying a dialog box having a prompt that describes the specific operation to be performed. The prompt describes the operation using at least one component-specific term that refers to a type of object or service on which the component operates. For example, the prompt "Allow access to photographs" refers to the term "photographs", which is a type of object on which a component for allowing access to photographs operates. As another example, the prompt "Allow access via Instant Messaging" refers to the term "Instant Messaging", which is a type of service on which a component for allowing access to Instant Messaging operates. The component-specific term is, in one example, more specific than a description of the underlying operating system function(s) that the component invokes. For example, an operating system-level operation for granting read permission would have a general description related to read permission, independent of any particular application or component objects or services.

In accordance with embodiments of the invention, the implicit consent security feature infers affirmative consent of a user to perform an operation in response to a user action that is not a response to an explicit request for permission to perform the operation. As an example of implicit consent, to specify a file, which is a starting point for operations that are potentially risky, the user interacts with the computer. A component may interpret the interaction as consent by the user to perform an operation, e.g., a restricted system operation, on the file. Similarly, for other resource types, a component that controls access to a resource type may allow a user to perform an operation on the resource type in response to the user interacting with the component's user interface in a particular way. The user's interaction, e.g., with a user interface component, signifies that the user implicitly grants permission to perform the operation. For example, the user action of dragging a file into a browser application that displays a web page provides implicit consent that code associated with the web page may operate on (e.g., read or write) the specified file.

In another example, the system may render an in-context dialog to provide, for example, user name and login credentials that are required by a component. This input would be rendered by the plugin common library 117 outside the control of the untrusted webpage 106, and in this case rather than prompting the user for permission to perform the operation, e.g., to "log into Flickr", we can integrate the acquisition of credentials into the flow. The user in this case may refuse to give Flickr credentials while using a specific website, and there is less intellectual expenditure by the end user. However the ultimate result is the same, the user has been directly asked outside the control of the webpage to approve an action.

Implicit consent allows for the combination of multiple user interaction steps into a single step. Using implicit consent, the user is not explicitly asked for permission to perform an operation. Instead, the user's granting of permission to perform the operation is inferred from his or her actions. Implicit consent improves the security and ease of use of web interactions. In a Flickr upload example, for example, the flow is as follows. Without implicit consent, (1) the user visits a page that uploads to Flickr but is not a product of Flickr; (2) the user is redirected to a Flickr pate to authorize to Flickr; (3) the user completes authorization on Flickr; (4) the user closes the Flickr page's window, returns to the original page, and completes authentication by clicking a button.

With implicit consent, the same authentication flow is performed in fewer steps: (1) the user visits a page that uploads to Flickr but is not a product of Flickr; (2) a "secure dialog" drops over the page; the secure dialog handles authorization to Flickr outside the control of the original page; (3) the user enters credentials and clicks ok; and (4) the original page is automatically notified. The final step of the first flow, clicking a button on the original page to indicate authentication is complete, is not necessary with implicit consent. Furthermore, subsequent accesses of the Flickr service may automatically supply the user's credentials to Flickr so that the user need not provide the credentials again if the login expires. The credentials are maintained securely and confidentially by the Flickr component.

In the Flickr login example, a component asks for permission to execute an operation that requires login credentials, e.g., logging onto Flickr. The webpage calls a function to authorize to Flickr. Prompting for credentials and transmission of an authorization request are performed by the core services 142 at the direction of a Flicker access component (e.g., the FlickerUploader shown in the components 148), outside the page's control. Upon completion of the authorization request, the webpage receives a return value which may be "authorized," "user refused to authorize," or "authorization failed (bad credentials)." Security is enhanced because the webpage does not have access to the user's credentials (e.g., login name and password) for the site for which authentication is performed.

In another example, to interact with a web-accessible camera (webcam), using explicit consent, (1) the user visits a web page that provides a web cam feature; (2) the user clicks on a "take picture from webcam" button; (3) the user is prompted outside the control of the webpage for permission to take a picture; and (4) the user clicks a "capture" button to take the picture. With implicit consent, the same webcam interaction is performed in fewer steps: (1) the user visits the webcam's page; (2) the user is presented with a dialog that displays the current webcam view (this dialog is outside the control of the webpage); (3) the user clicks the "capture" button, thereby granting implicit consent for the website to use the webcam. In accordance with embodiments of the invention, a secure resource representation is generated by that user interaction and is accessible in JavaScript code as a secure resource identifier. The identifier is tied to a specific resource, e.g., a file, and cannot be changed by browser-based (e.g., JavaScript) code. The identifier is, in one aspect, a random, unique number that can be referenced, but cannot be changed to refer to a different file or other resource. The lifetime of the file selection is based on the page lifetime, so the identifier becomes invalid after the page has been closed by the browser.

The component implementation prompts the end user independently of the browser-based code (e.g., JavaScript) on the web page. Therefore, the component code is bound by the response provided by the user, e.g., permission granted (affirmative) or denied (negative). In one aspect, any operation that may be security sensitive, e.g., may access or delete stored information, or may use a network connection, is a potential security risk and should be protected by secure user prompting, or, in one example, by a verifying a certificate-verified permission object that corresponds to the operation.

In one example, a white-list feature may be provided to enable or disable execution of particular components, or particular versions thereof, on particular web sites. A white list entry permits a site to use a particular component. A distribution server 150 distributes a signed distribution file, which includes a white list of domains that are permitted to use the component, a blacklist of components to purge (e.g., delete), and blacklist of platform versions to purge. For example, if version 1.0.1 of a component is known to have a bug, the blacklist feature can be used to prevent future execution of version 1.0.1. White list features may be controlled by users. For example, a music site may use a component to import a song directly into a user's Apple iTunes® music player directory. The component may ask user to allow an import one time, allow every time, or never allow.

In one example, clients that use the plugin interface platform 108 of FIG. 1A include a blacklist feature for purging components and/or specified versions thereof. The client downloads a digitally-signed bundle that contains a permission bundle. This download may occur at specified times, or periodically, in response to a message received from the server, or at other times. The permission bundle includes a revocation list that lists one or more components and corresponding versions to be purged. Any installed components that are on the revocation list are purged, and any subsequent attempts to re-install the purged component do not succeed. The plugin interface platform 108 may itself be remotely disabled by a designated entry in the revocation list.

New versions of components may be made available from time to time. Because of the large number of components that may be installed on an end-user machine 102, keeping all of the installed components up to date may negatively affect performance and/or excessively consume resources. As a user visits sites that use components, the sites express component requirements as requirement statements, e.g., component name, version, and minor version triplets. The full requirements are stored with the last time requested. Update checks periodically purge outdated requirement statements and check the distribution server for components that satisfy the remaining current requirements and are newer versions of components presently installed on the machine 102. Any such newer versions are downloaded in the background, e.g., without stopping any executing components, and stored in an update cache. Subsequently, if the web browser 104 visits a site that expresses a requirement that would be better served by an available cached update, the user is prompted for permission to install the downloaded update. Out-of-date components may be identified and deleted by, e.g., finding components that are not used to satisfy the current requirements and have not been used for an extended period of time. These components may be purged from the machine 102 with minimal negative effects.

Figure 6:
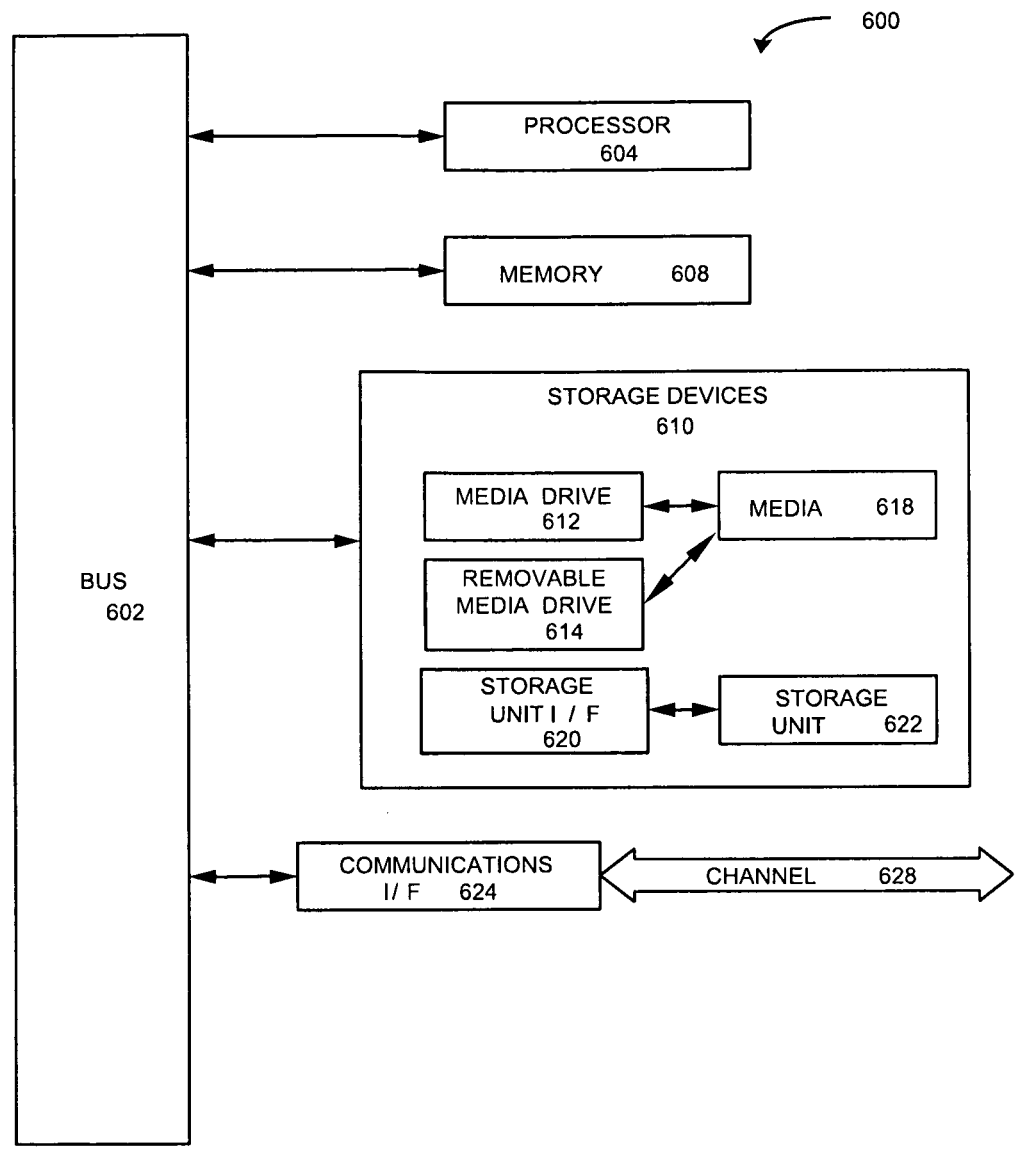
FIG. 6 illustrates a typical computing system that may be employed to implement processing functionality in embodiments of the invention.

FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
providing, by a computer, a plugin interface for enabling browser-based code to execute restricted system operations that access native system resources of a user machine, the restricted system operations are executed by a plurality of computer program code components stored on the user machine, each of the computer code components comprise a native code portion and the plugin interface comprising a native code common library that enables invocation of the computer code components upon receiving a respective type of user permission associated with each of the computer code components;

including, by the computer, a first reference to one of the computer program code components in computer program script code executed in a web browser on the user machine;

configuring, by the computer, the plugin interface to receive a description of at least one component operation associated with the referenced computer program code component in response to the first reference, the at least one component operation operable to cause execution of at least one of the restricted system operations;

enabling, by the computer, generation of a risk rating for the referenced computer program code component to be executed by the user machine, wherein the risk rating indicates a risk posed to the user machine by the referenced computer program code component should the user machine execute the referenced program code component, the risk rating associated with the at least one component operation and a risk level, the risk level is selected from at least two risk levels based upon a signed digital certificate associated with the component;

generating, by the computer, a description of the at least one component operation related to the restricted system operation based on the interface definition; and prompting, by the computer via the plugin interface, a user for the respective type of user permission associated with the at least one restricted system operation, wherein the prompt is configured to display the risk rating associated with the component operation and the description of the component operation wherein the description comprises at least one term specific to the referenced computer code component.

2. The method of claim 1, wherein generating the risk rating is in response to receiving a web page that includes the computer program script code referencing the computer program code component.

3. The method of claim 1, wherein the at least two risk levels, include a highest risk level and a lowest risk level.

4. The method of claim 1, wherein the computer program code component is for execution in response to an invocation of the plugin interface executing in the web browser by the computer program script code executed in response to the web browser receiving a web page associated with the script code.

5. The method of claim 1, wherein prompting a user for permission comprises displaying a named permission, wherein the named permission corresponds to the at least one restricted system operation, and the named permission is to be granted by the end user as a precondition to executing the restricted system operation.

6. A method of enabling web browser-based code to execute a restricted system operation on a client computer, the method comprising:

transmitting, by a server computer, computer program code to the client computer, the code including a plugin interface for invoking restricted system operations accessing native resources of the client computer, the restricted system operations are executed by a plurality of computer code components stored on the client computer, each of the computer code components comprises a native code portion and the plugin interface comprises a native code common library that enables invocation of the computer code components upon receiving a respective type of user permission associated with each of the computer code components;

including, by the server computer, a first reference to one of the computer program code components in the transmitted computer program code executed in a web browser on client computer;

configuring, by the server computer, the plugin interface to receive at the client computer, in response to the first reference, a description of at least one component operation associated with the referenced computer program code component, the at least one component operation operable to cause execution of at least one of the restricted system operations;

causing, by the server computer, via the native code common library a display of a prompt at the client computer, the prompt for requesting a type of permission from the user to perform the at least one restricted system operation, and further operable to invoke the at least one restricted system operation in response to receiving permission from the user, and wherein the prompt is configured to display a risk rating associated with the component operation and the description of the component operation comprising at least one term specific to the at least one computer code component, the risk rating indicates a risk posed by the component to the client computer should the client computer execute the component and the risk rating is based upon a risk level, the risk level is selected from least two risk levels based upon a signed digital certificate associated with the component.

7. The method of claim 6, wherein the risk indicator comprises a phrase based upon at least one operation provided by the component.

8. The method of claim 6, wherein the component comprises an implementation function and an interface definition describing the implementation function.

9. The method of claim 6, wherein the prompt displays a request for permission on an output device of the computer.

10. The method of claim 6, wherein receiving permission from the user comprises receiving an affirmative response from the user via an input device of the computer.

11. The method of claim 6, further comprising:
receiving the certificate of a signing authority associated with the component.

12. The method of claim 6, wherein the restricted system operation comprises accessing a file, accessing a network, accessing a display device, or a combination thereof 13. A method of enabling web browser-based code to execute a restricted system operation on a client computer, the method comprising:

transmitting, by a server computer, computer program code to the client computer, the transmitted program code comprising a plugin interface for enabling browser-based code on the client computer to execute restricted system operations that access native system resources of the client computer, the restricted system operations are executed by a plurality of computer program code components stored on the client computer, each of the computer code components comprise a native code portion and the plugin interface comprising a native code common library that enables invocation of the computer code components upon implicitly receiving a respective type of user permission associated with each of the computer code components;

including, by the server computer, a first reference to at least one of the computer code components in the transmitted computer program code such that when the transmitted computer program code is executed by the web browser one of the computer code components is invoked in response to the first reference by script code associated with a web document comprising the plugin interface;

enabling, by the server computer, automatic execution of at least one of the restricted system operations in response to receiving, in an absence of an explicit request for permission, an input from a user via the web browser, the input causing an execution of a component operation associated with the invoked component and the at least one restricted system operation, the input implicitly granting the respective type of consent associated with the invoked component to perform the at least one restricted system operation.

14. The method of claim 13, wherein the action comprises at least one step in performing the component operation.

15. A method of enabling web browser-based code to execute a restricted system operation on a client computer, the method comprising:

receiving, by the client computer, a webpage comprising the web browser code and a plugin interface facilitating the web browser code to access a plurality of computer code components that are stored on the client machine and execute restricted system operations accessing native system resources of the client machine, each of the computer code components comprise a native code portion, the plugin interface comprises a native code common library that permits invocation the computer code components upon receiving a respective type of permission associated with each of the computer code components;

executing, by the client computer, a first reference to one of the computer program code components via computer program script code in a web browser;

accessing, by the client computer, a description of an operation of the computer program code component that invokes at least one of the restricted system operations in response to the first reference;

transmitting, by the client computer, the description to the plugin interface;

displaying, by the client computer, a prompt for requesting permission from a user to perform the restricted system operation in response to the first reference of the computer program code component by the web browser code; and invoking the restricted system operation in response to receiving permission from the user, wherein the prompt refers to an object or service on which the component operation operates via a description of the component operation comprising at least one term specific to the computer code component associated with the first reference, the prompt comprises a risk rating associated with a component performing a component operation, the risk rating indicates a risk posed to the client computer by the component, should the component be invoked by the client computer, the risk rating is based upon the component operation and a risk level, the risk level is selected from at least two risk levels based upon a certificate of a signing authority associated with the component.

16. A non-transitory computer readable storage medium comprising computer-executable instructions for enabling computer program code to be executed in a web browser to perform security-restricted operations, the instructions comprising:

providing, by a server computer to the web browser via a computer network, a plugin interface that provides browser-based code access to a plurality of components, each of the components includes an interface and a native language implementation that implements at least a portion of the interface, the plugin interface comprises a native code common library that enables the computer program code executed in the web browser to perform at least one of the security-restricted operations via invocation of at least one of the plurality of components upon receiving a respective type of user permission associated with each of the computer code components;

generating, by the server computer, a description of an operation of the at least one component that invokes the security restricted operation;

wherein the implementation is operable to invoke the native language implementation in response to invocation of the component interface by the plugin interface in the web browser, and wherein the native language implementation is operable to prompt a user for the respective type of permission to perform the security-restricted operation, and further operable to invoke the security-restricted operation in response to receiving permission from the user, wherein the prompt is configured to display a risk indicator associated with the component, the risk indicator indicates a risk posed by the component to a computer executing the web browser should the computer executing the web browser implement the component, the risk indicator is further based on the security restricted operation and a risk level, the risk level is selected from at least two risk levels based upon a certificate of a signing authority associated with a component, the prompt is further based upon at least one permission requirement associated with the component, and the prompt includes a description of an operation associated with the permission requirement wherein the description comprises at least one term specific to the at least one component.

17. The non-transitory computer readable storage medium of claim 16, further comprising:

receiving the certificate of a signing authority associated with the component.

18. The non-transitory computer readable storage medium of claim 16, wherein the security restricted native operating system operation comprises accessing a file, accessing a network, accessing a display device, or a combination thereof.

19. A non-transitory computer readable storage medium comprising computer-executable instructions for enabling browser-based program code associated with a web page to selectively access native operating system resources of a browser host computer, the method comprising:

receiving, by the browser host computer, a plugin interface that enables the browser-based program code to access a plurality of components stored on the browser host computer, the plugin interface comprises a native code common library that permits invocation of the plurality of components, each of the plurality of components includes an implementation function and an a native code interface to perform restricted system operations that access native system resources of the browser host computer in response to receiving a respective type of permission from a user of the browser host computer to access the restricted system operations;

executing, by the browser host computer, a first reference to at least one of the plurality of components comprised in the browser-based program code;

receiving, by the browser host computer, a description of the implementation function of the at least one component in response to the first reference;

prompting the user for the respective type of permission to perform at least one of the restricted system operations, the prompt comprises a description of an operation associated with the respective type permission requirement wherein the description comprises at least one term specific to the at least one component, the prompt is based upon a risk indicator associated with the at least one component, the risk indicator indicates a risk posed to the browser host computer should the browser host computer execute the implementation function of the at least one component, the risk indicator is based on a risk level, the risk level is further selected from at least two risk levels based upon a certificate of a signing authority associated with the at least one component; and invoking the implementation function of the at least one component to perform the at least one restricted system operation in response to receiving an affirmative response from the user.

20. A system, comprising:
a processor;
a memory coupled to the processor; and program instructions provided to the memory and executable by the processor to:

transmit computer program code to a client computer, the program code comprising a plugin interface for enabling browser-based code to execute restricted system operations that access native system resources of the client computer, the restricted system operations are executed by a plurality of computer program code components stored on the client computer, each of the computer program code components having a native code portion and the plugin interface comprising a native code common library that permits invocation of the computer program code components upon receiving implicitly a respective type of user permission associated with each of the computer program code components;

the transmitted code for execution by a web browser on the client computer comprises a first reference to at least one of the computer code components implementing at least one of the restricted system operations, wherein the transmitted code is further operable to invoke the at least one restricted system operation implemented by the at least one computer code component in response to receiving an input from a user via the web browser, and the input is for causing an action associated with the at least one component in absence of an explicit request for permission to perform the restricted system operation, the action implicitly granting user consent of the respective type associated with the at least one component to perform the restricted system operation.

21. The system of claim 20, wherein the action comprises at least one step in performing an operation associated with the at least one component.

\* \* \* \* \*